United States Patent Office 3,443,576
Patented May 13, 1969

3,443,576
FLOW REGULATING SYSTEM
Willis D. Kervin, 1306 Sunset Drive,
Johnson City, Tenn. 37601
Filed Nov. 29, 1966, Ser. No. 597,725
Int. Cl. G05d 11/00
U.S. Cl. 137—88                                    21 Claims

ABSTRACT OF THE DISCLOSURE

Apparatus for regulating the mixing of fluids where a differential pressure detector is used to monitor the pressure differences between a primary and secondary fluid. A secondary regulator is controlled by the differential pressure detector. The fluids are mixed in a mixing unit, the density of the mixture at the output of the mixing unit being monitored.

---

This invention relates to the control of fluids, and more particularly, to the regulated mixing of gaseous fluids.

Mixtures of fluids have widespread application in physical and chemical processes. For example, accurately controlled mixtures of gases are widely used as fuels and as ingredients at various stages of chemical processing. To the extent that the constituents of a mixture are present in prescribed proportions, the mixture will exhibit desired characteristics.

To control the proportions of a mixture, its constituents enter a mixing chamber at a regulated rate. For the regulation to be effective, it must be capable of coping with a wide variety of changes throughout the system. These include variations at the fluid sources, at various regulators and at the mixing chamber.

Thus, variations at the regulators, if uncompensated or unaccommodated by variations in another part of the system, can bring about an adverse change in the proportions of the desired mixture. Such variations may occur on a transient basis when a system is being placed in operation. They may also occur, for example, during a steady state operating interval whenever there is an inadvertent change in regulator setting.

Variations may also occur in the rate at which a mixture is available at a mixing chamber, as well as in the rate at which it is withdrawn from the chamber. Under these conditions it is difficult for the mixture to hold its desired proportions, particularly when the output of the mixing chamber varies over a wide range.

Still other variations occur at the fluid sources of the system because of fluid nonuniformities and because of temperature and source pressure changes.

Accordingly, it is an object of the invention to regulate the mixing of fluids with precision. A related object is to regulate the mixing of fluids in response to departures of the mixture from predetermined proportions. Another object is to enhance the effect of a detected departure in restoring the mixture to its predetermined proportions.

Still another object of the invention is to provide for the automatic regulation of the mixing of fluids. A related object is to synchronize the operations of various units in an automatic fluid regulating system so that variations in one part of the system are accommodated by corresponding variations in another part of the system. Another object is to hold deviations from a mixture of predetermined proportions to within acceptable tolerances during transient, as well as steady state, operating intervals.

It is a still further object of the invention to control the mixing of fluids within prescribed limits despite output variations of the resulting mixture. Another object is to control the proportions of the mixture with precision despite changes in its constituents, particularly changes due to fluid nonuniformities, source pressure fluctuations, and temperature variations.

In addition to a capability for coping with a wide variety of changes, the system is desirably protected against extreme conditions, such as the occurrence of excessive pressures which could not only damage the system but also cause gross errors in processes that require fluid mixtures with precisely proportioned constituents.

Other aspects of the invention will become apparent after considering several illustrative embodiments thereof, taken in conjunction with the drawings, in which.

Figure 1:
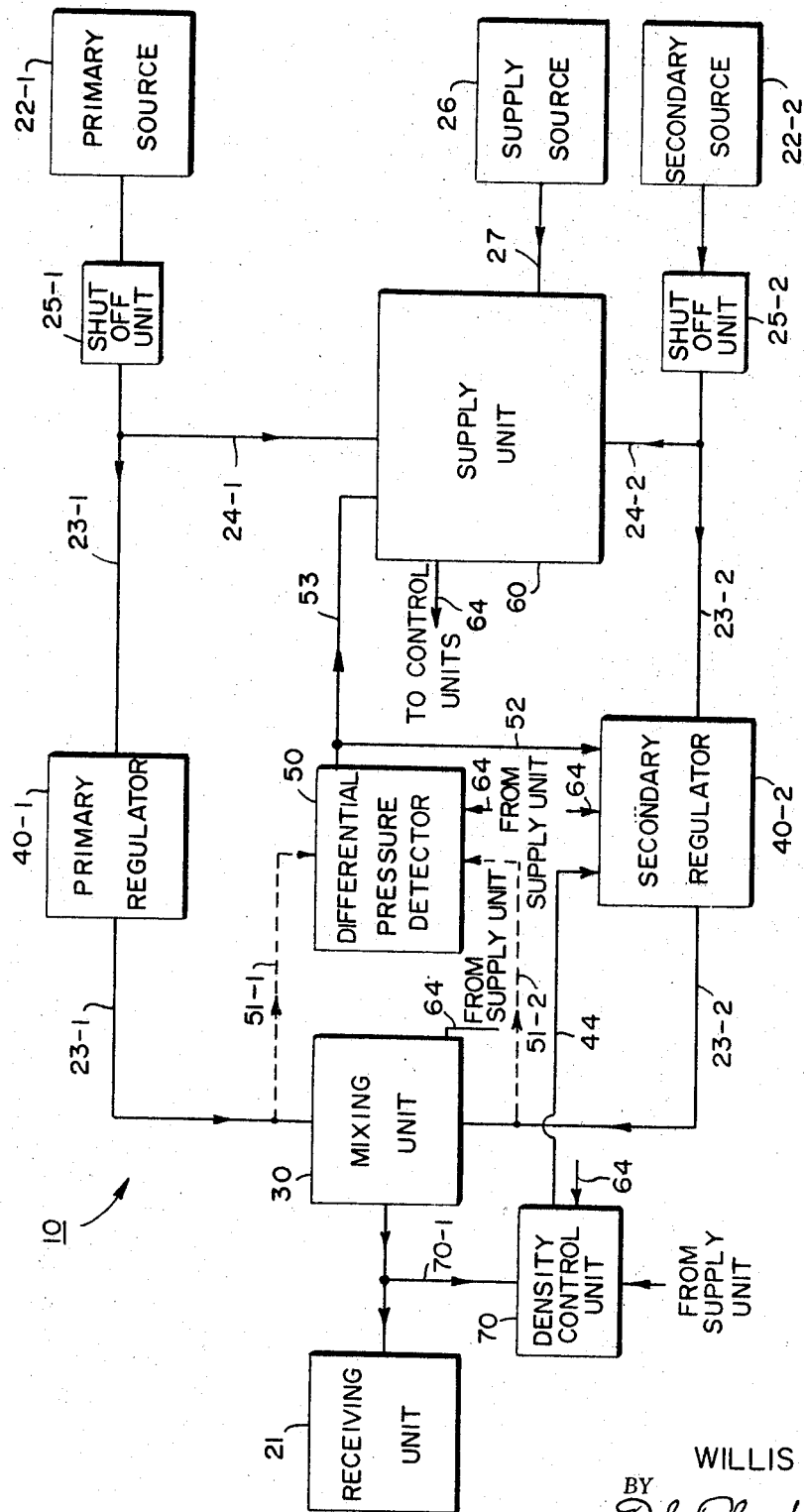
FIG. 1 is a block diagram of a regulating system in accordance with the invention.

Turning to the drawings, the regulating system 10 of FIG. 1 supplies a regulated mixture of gases, such as propane and air, to a receiving unit 21. The gases originate at individual sources 22–1 and 22–2 and are fed by respective conduits 23–1 and 23–2 to a mixing unit 30. The output of the mixing unit 30 is taken by the receiving unit 21.

To fix the proportions of the mixture, the pressures of the gases entering the mixing unit 30 are individually and automatically regulated. This is accomplished by a primary regulator 40–1 in the primary conduit 23–1 and a secondary regulator 40–2 in the secondary conduit 23–2. Before entering the regulators 40–1 and 40–2, the conduits 23–1 and 23–2 pass through respective shutoff units 25–1 and 25–2. The units 25–1 and 25–2 desirably include such standard items as line strainers, check valves and hand shutoff valves.

The primary regulator 40–1 is sensitive to pressure changes in its own conduit 23–1 so that as long as the pressure at the inlet port of the mixing unit for the conduit 23–1 is below the setting of the regulator 40–1, the opening of an internal valve is spontaneously adjusted to control the pressure. However, the secondary regulator 40–2 is controlled with respect to the pressure established in the primary conduit 23–1. For this purpose the pressures at the inlets to the mixing unit 30 for both the primary and secondary conduits 23–1 and 23–2 are monitored by a differential pressure detector 50 through sense lines 51–1 and 51–2. Whenever the detected difference in pressure differs from the threshold level of the detector 50, an internal valve of the secondary regulator 40–2 is adjusted to permit a change in pressure on the secondary conduit 23–2 until the difference in pressure is below the threshold level of the detector.

Consequently, the pressure of the gas, for example propane, in the primary conduit 23–1 serves as a reference with respect to which the pressure of the gas, for example air, in the secondary conduit 23–2 is controlled. Moreover, the proportions of the two gases applied at the inlet ports of the mixing unit 30 are relatively fixed, regardless of the rate at which the mixture is withdrawn by the receiving unit 21.

In addition, since the pressure in the secondary conduit 23–2 is fixed with respect to the pressure of the primary conduit 23–1, the output of the mixing unit 30 during the initial period when the system is coming to equilibrium is also in the desired ratio of constituents. This is because a gradual increase in pressure attributable to the action of the primary regulator 40–1 is accompanied by a corresponding increase in pressure because of the secondary regulator 40–2.

The overall volume of the mixed gases taken by the receiving unit 21 is determined by an internal valve within the mixing unit 30. In one form of mixing unit, the internal valve operates in a fashion similar to that described for the primary regulator 40–1. When the pressure of the mixed gases at the outlet of the mixing unit 30 is low, the internal valve causes the inlets to be at maximum aperture; later, as the pressures of the mixed gases increase to an equilibrium level, the inlet apertures are reduced. When the demand of the receiving unit 21 increases above the present level of the mixing unit 30, resetting may take place either manually or automatically.

The various control components, including the mixing unit 30, the regulators 40–1 and 40–2 and the detector 50 of the system in FIG. 1, require a supply of fluid such as air in order to exercise their control functions. For this purpose, supply fluid from a source 26 is regulated by a supply unit 60. The supply source 26 may be fed by, or be a part of, one of the other sources 22–1 and 22–2. Where air is provided by the secondary source 22–2, it typically is tapped to serve as the supply source 26.

Figure 2:
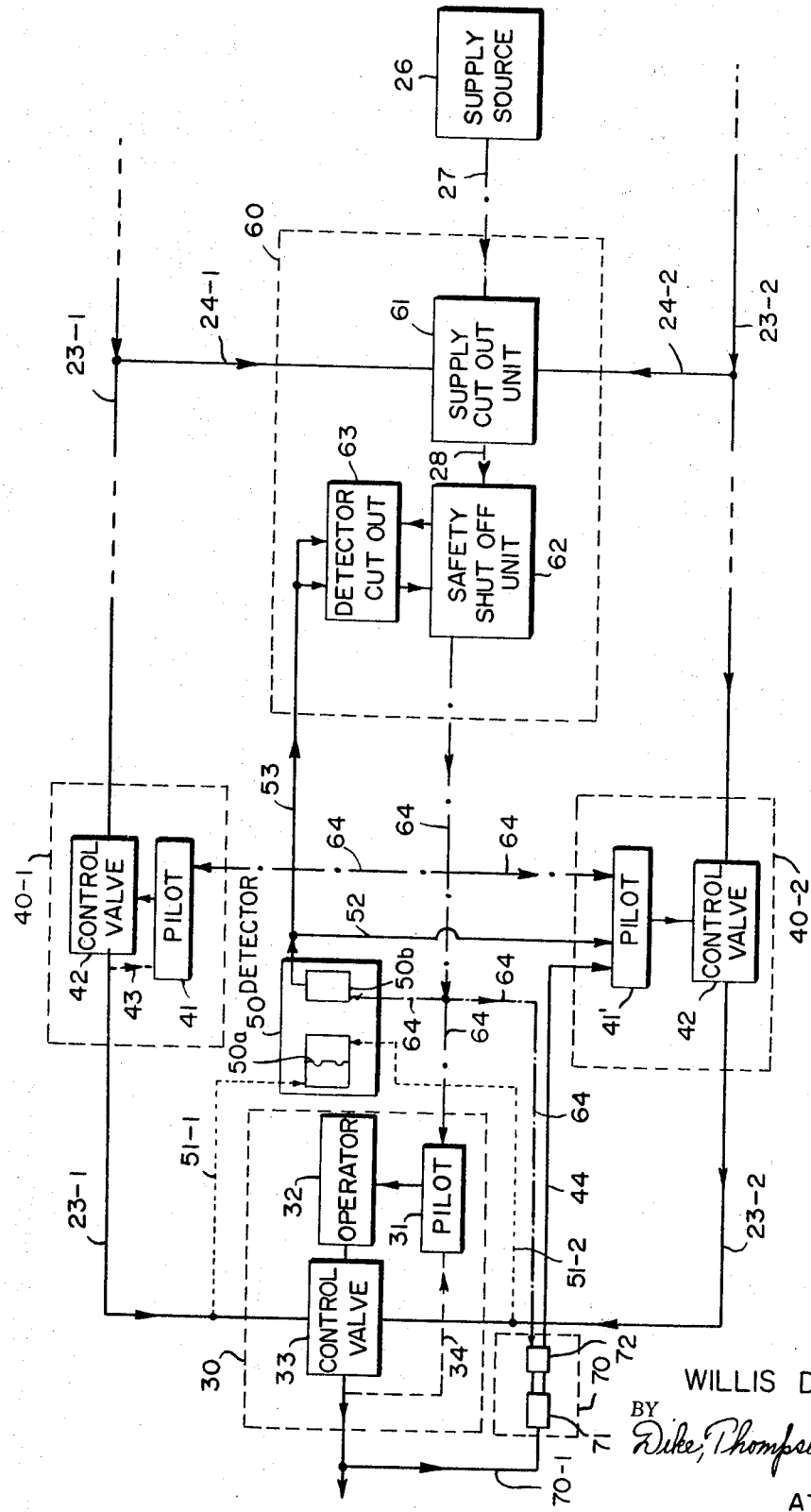
FIG. 2 is a partial block diagram illustrating details for the components of FIG. 1.

In order to prevent premature operation of the system before the pressures from the primary source 22–1 and the secondary source 22–2 have reached suitable levels, the supply unit 60 contains a cutout unit 61 as shown in FIG. 2. Entering the cutout unit 61 are a propane branch 24–1 of the primary conduit 23–1 and an air branch 24–2 of the secondary conduit 23–2. Once the pressure levels for the propane and air conduits 23–1 and 23–2 are at suitable levels, the cutout unit 61 operates and permits the air supply to pass from the component supply source 26 by a line 27 through the cutout unit 61 and thence by a connecting line 28 to a safety shutoff unit 62. The safety shutoff unit 62 operates through a detector cutout unit 63 which is operated from the detector 50. As long as the output from the detector 50 is within a prescribed range, the safety shutoff unit 62 is inoperative, unless it is operated manually. Further details of the constituents of the supply unit 60 will be considered subsequently.

After passing through the shutoff unit 62, the air supply is directed by a supply line 64 to the primary regulator 40–1, the secondary regulator 40–2, the differential pressure detector 50 and the mixing unit 30. The supply unit 60 serves a similar purpose as, and may be analogized with, the power supply of an electrical system.

In the primary regulator 40–1, the primary 64 energizes a pilot 41 (FIG. 2). The output of pilot 41, in turn, acts upon a control valve 42, which is closed until the pilot is energized. Once the pilot has been energized, the air supply is routed to control the opening of the control valve. As the valve is opened, the pressure of the propane gas in the primary conduit 23–1 builds up at the output of the regulator 40–1. A pressure-sense line 43 extends to the measurement port of the pilot 41 and is used for indicating when the control valve output pressure has reached the pressure setting of the pilot 41. The pilot 41 then becomes inactive and the control valve 42 holds its setting until there is a change in the output pressure of the regulator 40–1.

The control valve 42 is a normally closed, spring-loaded diaphragm valve of conventional type. When the air supply is admitted from the pilot 41 to the casing 42a of the valve 42, its diaphragm 42b opens the valve unit 42c is proportion to the pressure of the air supply. When the pressure of the air supply is decreased, the spring 42e of the valve 42 drives the valve unit 42c towards its closed position.

The pilot 41 for the primary regulator 40–1 is a pressure controller. When air pressure is supplied to a pneumatic relay within the pilot, pressure is transmitted to the casing containing the diaphragm in the control valve 42 to open the valve until the downstream pressure in the primary conduit 23–1, as monitored by the pressure-sense line 43, reaches the set point pressure of the pilot 41. In a tested model of the invention the pilot 41 was a Pneumatic Indicating Controller Model 43A manufactured by the Foxboro Company of Foxboro, Mass., as adapted to respond to the pressure-sense line 43.

The secondary regulator 40–2 is also energized by the air supply from the supply unit 60. Within the secondary regulator, a control valve 42 is identical with, and serves the same function as, the corresponding valve of the primary regulator 40–1. Controlling the valve 42 of the secondary regulator 40–2 is a pilot 41', which operates from the supply line 64 but which differs from the corresponding pilot 41 in the primary reegulator 40–1 in that it operates independently of the pressure in the secondary conduit 23–2, and in that the pressure-sense line 43 of the primary regulator 40–1 is replaced by the control line 52 from detector 50 so that the pilot 41' operates to actuate its diaphragm valve 42 as long as there is an output from the differential pressure detecting unit 50 through line 52. In addition, the set point of the pilot 41' is controllable by a signal from the density control unit 70 through line 44 in the fashion to be described subsequently. In a tested embodiment of the invention, the pilot 41' was a Pressure Differential Recording Controller Model 40 manufactured by the Foxboro Company of Foxboro, Mass.

The detector 50, which controls the secondary regulator 40–2, is also energized by the supply unit 60. Central to the detector 50 is a small diagram sensing element 50a which controls a detector valve 50b. Lines 51–1 leads to one side of the diaphragm and line 51–2 leads to the other side. When the pressures applied to each side of the diaphragm by the pressure-sense lines 51–1 and 51–2 are equal, a predetermined equilibrium level of supply air is passed from the detector through the detector valve and thence through a control line 52 to the pilot 41' of the secondary regulator 40–2. As the pressure differential is increased or decreased, the pressure of the supply air in the control line 52 changes proportionally. In a tested model of the invention the detector 50 was a Differential Pressure Cell Transmitter Model 13A manufactured by the Foxboro Company of Foxboro, Mass. The Differential Pressure Cell Transmitter was operated so that with equal pressures applied to the diaphragm from the pressure-sense lines 51–1 and 51–2, i.e. with a pressure differential of zero, the supply air in the control line 52 had a pressure of 9 p.s.i.g. (pounds per square inch of gauge pressure). This kind of operation permits a relatively instantaneous output response to a change in input. When the pressure in the line 51–1 increased over the pressure in the line 51–2 by any differential amount, there was a corresponding increase in the supply pressure in the control line 52. A corresponding decrease in supply pressure took place when the pressure in the sense line 51–1 decreased below the pressure in the sense line 51–2.

Besides being energized by the supply unit 60, the detector 50 also exercises a safety function with respect to the supply unit 60. For this purpose, a branch 53 of the control line 52 extends to the cutout unit 63 of the supply unit 60. If the differential pressure in the pressure-sense lines 51–1 and 51–2 becomes either too great or too little, the pressure in the control line 53 operates the safety shutoff unit 62 in a manner to be described in greater detail subsequently. In a tested model of the invention the detector 50 was calibrated so that when the pressure in sense line 51–1 exceeded the pressure in sense line 51–2 by an amount sufficient to raise a column of water ten inches, i.e. 10" W.C., a total control pressure of 15 p.s.i.g. was produced in lines 52 and 53. Since the equilibrium control pressure in lines 52 and 53 was 9 p.s.i.g. when the pressures in 51–1 and 51–2 were equal, the same setting produced a control pressure of 3 p.s.i.g. with a negative pressure differential of 10" W.C. in the pressure-sense lines 51–1 and 51–2, i.e. when the pressure in 51–2 exceeds that in 51–1 by 10″ W.C.

Another control unit energized by the supply unit 60 is the mixing unit 30. The operational arrangement is similar to that for the primary regulator 40–1. A pilot 31, which is energized by the supply line 64, activates an operator 32 of a control valve 33. A pressure-sense line 34 from the output of the mixing unit 30 cooperates with the pilot 31 in the same way as the pressure-sense line 43 cooperates with the pilot 41 of the primary regulator 40–1, to control the output of the control valve 33.

Figure 3:
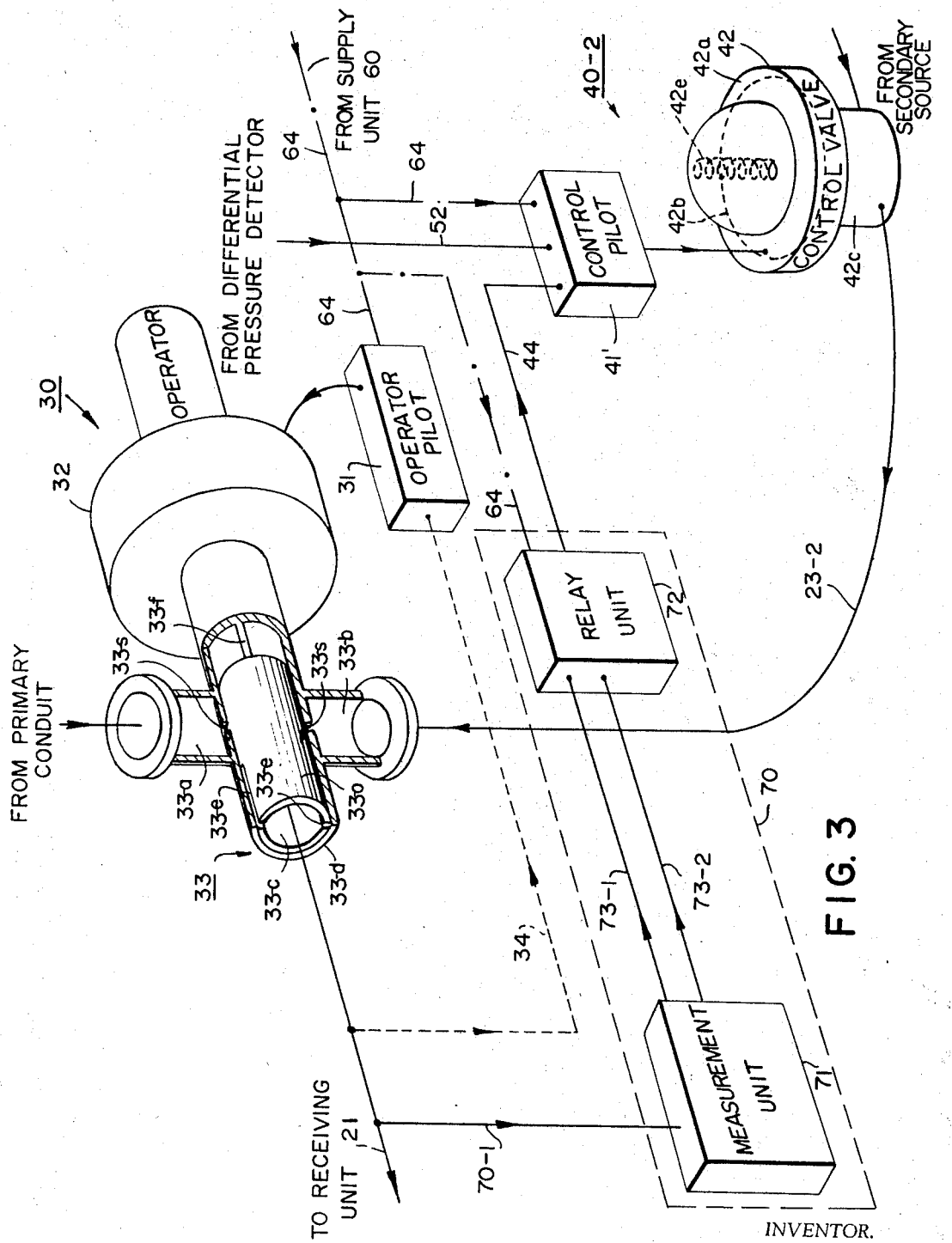
FIG. 3 is a partial perspective and cross-sectional view of a mixing unit, together with a block diagram of associated components, for the system of FIG. 1.

The mixing unit 30 desirably includes the operator 32 and the mixing valve 33 shown partially in perspective and partially in cross section in FIG. 3 and described in detail in my copending application, Ser. No. 519,870 filed Jan. 11, 1966 and allowed June 5, 1968.

The valve 33 shown in FIG. 3 has an inlet chamber 33a for the primary conduit 23–1 and a corresponding inlet chamber 33b for the secondary conduit 23–2. Between the two inlets is a mixing chamber 33c formed by an outer cylinder 33d with slots 33s at the respective inlets, and an inner cylinder 33o, with longitudinal slots 33e beyond the inlets.

Within the operator 32 is a diaphragm which is pressure actuated from the pilot 31. When the diaphragm is actuated, it moves, through the actuating rod 33f, the inner cylinder 33o of the mixing valve 33 longitudinally with respect to the outer cylinder and permits gases at the inlet chambers 33a and 33b to enter the mixing chamber 33c through slots 33s and 33e. The extent to which the slotted inner cylinder 33o is moved axially towards the inlet chambers (to the right as viewed in FIG. 3) determines the volume of the output fluid mixture from the mixing unit 30. By manually rotating the inner cylinder 33o as described in my copending patent application, the slotted openings that extend through the cylinders 33d and 33o are differentially changed to an increasing or decreasing extent depending upon whether the rotation is clockwise or counterclockwise, thus controlling the volumetric ratio of the two gases in the mixing chamber 33c.

Although the volumetric proportions of the mixture in the mixing chamber 33c can be determined by the circumferential setting of the outer cylinder 33d with respect to the inner cylinder 33o, the proportions may also be controlled, in accordance with the invention, by the density control unit 70 forming part of a feedback loop which extends from the outlet of chamber 33c to the pilot 41′ of the secondary regulator 40–2 and which is made up of density sense line 70–1, the density control unit 70 and the control line 44.

Under ordinary circumstances, the gaseous streams in each of the primary and secondary conduits 23–1 and 23–2 remain substantially uniform during operation. However, because of temperature and density changes, even with the pressure differential maintained by the detector 50 of FIG. 1, the mixture at the outlet from chamber 33c may not have the proportions desired. This may be due to variations in density or temperature of only one of the gaseous streams. Such is the case when the secondary gas is derived by using an ordinary air compressor.

When the density of the gas in the secondary line 23–2 is reduced, with no change in pressure, the ratio of the mixed gases may nevertheless be maintained relatively constant by virtue of the action of the feedback loop 70.

Included in the density control unit 70 are a density measurement unit 71 of conventional design and a relay unit 72. The relay unit 72 may be adapted from a pilot unit, such as the pilot 31 of the mixing unit 30, in which case it is also energized by a branch of the supply line 64.

When the measured density at the outlet from chamber 33c falls below a desired level, the measurement unit 71 senses this and operates a pneumatic relay within the relay unit 72 to automatically change the pressure setting of the secondary regulator 40–2. As a result the differential pressure between the two conduits 23–1 and 23–2 is changed to restore the original density condition of the mixture at the outlet from 33c. In this way the ratio of the mixed gases is maintained relatively constant despite temperature and barometric variations for the air in the secondary conduit 23–2.

In a tested embodiment of the invention the density measurement unit 71 included a differential regulator of conventional design and a density cell such as the Model 35 Gas Density Cell manufactured by the Foxboro Company of Foxboro, Mass. The differential regulator feeds a constant volume of gas from the output of the mixing valve to the density cell, which illustratively contains a motor-driven impeller that gives rise to a difference in pressure on two output taps 73–1 and 73–2 in direct proportion to the density of the gas.

The pressure difference at the output of the measurement unit 71 is translated into a control signal and amplified by the relay unit 72. In a tested embodiment of the invention, the relay unit 72 included a first amplifier which produced an output in proportion to the pressure difference at the taps 73–1 and 73–2 and a second amplifier whose output was applied to the pilot line 44 to determine the setting of the control pilot 41′. For one embodiment of the invention the first amplifier of the relay unit 72 was a Model 15A Differential Pressure Cell Transmitter manufactured by the Foxboro Company of Foxboro, Mass. The second amplifier was a pilot like 41 and 41′ except that the output from the first amplifier was connected to the measurement port of such pilot and the output of the amplifier pilot was applied to the setting port of pilot 41′. In addition, a recorder was included at the output of the first amplifier and calibrated to indicate the specific gravity of the mixed gases being applied to the receiving unit 21. A control switch was included in the pilot line 44 to inactivate the density control unit 70.

Figure 4:
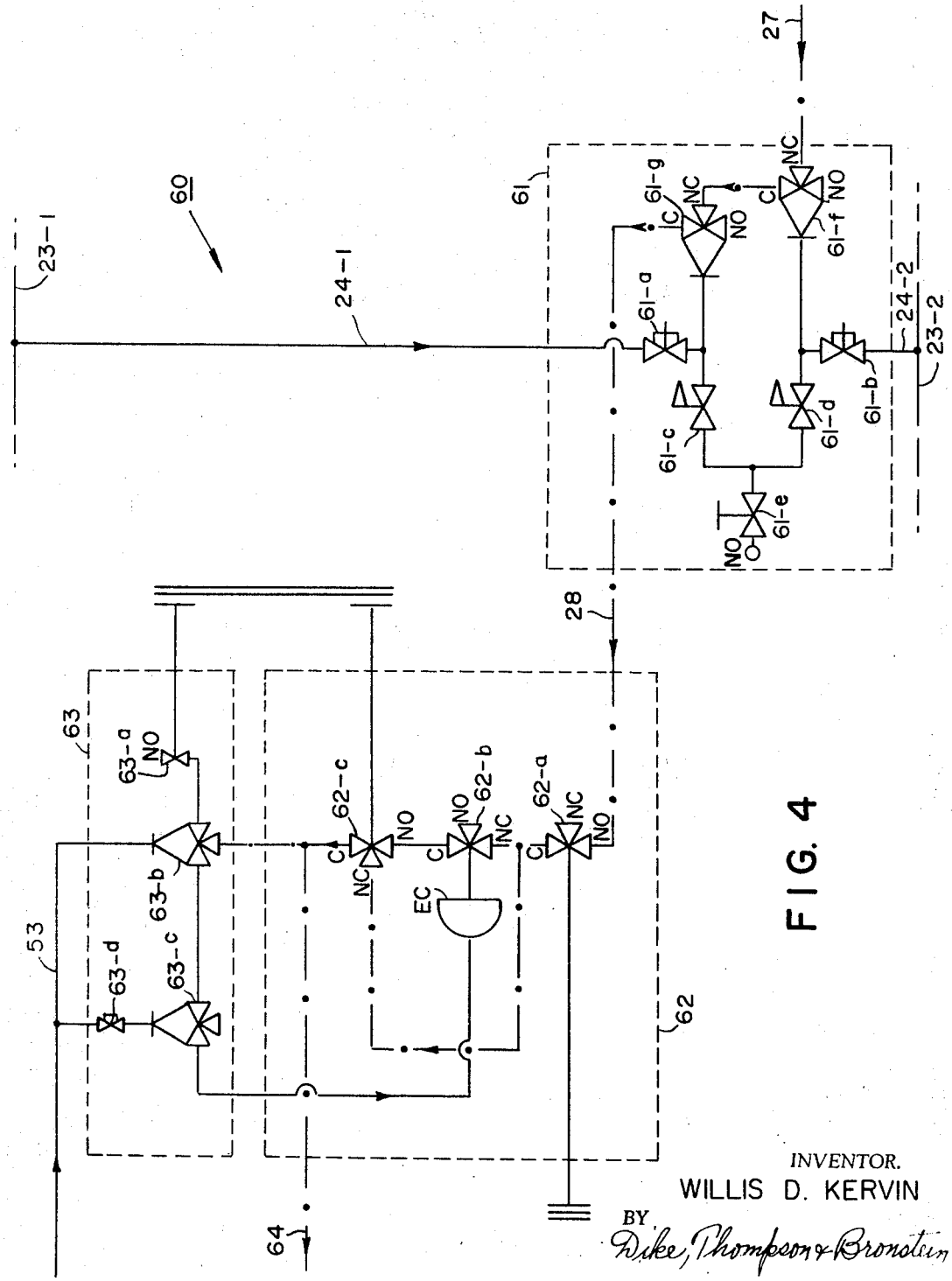
FIG. 4 is a symbolic diagram of the component supply unit for the system of FIG. 1.

The supply unit 60 of FIG. 2 is shown in detail by the symbolic diagram of FIG. 4. Beginning with the supply cutout 61, the propane and air branches 24–1 and 24–2 from the primary and secondary conduits 23–1 and 23–2 respectively include needle valves 61a and 61b for volumetric control of flow. Beyond the needle valves the branch conduits pass through lockup regulators 61c and 61d to a hand valve 61e. As long as the hand valve 61e is open, the supply line 27 from the supply source 26 is blocked by an air controlled cutout relay 61f and a propane controlled cutout relay 61g. As a result, there is no air supply to any of the control components until the pressures in the branches 24–1 and 24–2 of the primary and secondary conduits 23–1 and 23–2 have reached prescribed levels.

In order to apply the air supply to the control components, the hand valve 61e is closed. The hand valve 61e is an ordinary two-position valve that is either open or closed, the designation NO signifying the port that is "normally open." Closure of the valve 61e traps air in the conduit extending to the air lockup regulator 61d and propane in the conduit extending to the propane lock-up regulator 61c. The lockup regulators 61c and 61d are ordinary pressure reducing regulators with an adjustable range. They are connected backwards in order to serve the desired lockup function.

The air regulator 61d functions when the air pressure reaches a predetermined level. This permits air pressure to enter the dome of the air controlled supply cutout 61f. The supply cutout 61f is a three-way diaphragm controlled valve with three ports which are respectively, normally open "NO," normally closed "NC," and common "C." The line to the dome can be regarded as a control port. A channel extends from the common orifice C to either the normally closed orifice NC or the normally open orifice NO, depending on the pressure in the dome.

When air originating at the secondary conduit 23-2 enters the control port of the dome, the diaphragm, which is sealed against the normally closed port NC by spring action, is moved towards the seat of the normally open port NO. Consequently, when the air pressure in the secondary conduit 24-2 reaches a suitable level, the supply line 26 is extended to the propane controlled cutout 61g. Similarly, suitable propane pressure in the dome of the propane controlled cutout 61g causes it to operate and extend the supply line 27 by an extension 28 to the safety shutoff unit 62. In a tested model of the invention, the cutouts 61f and 61g were three-way Regulators Type 164A manufactured by the Fisher Governor Company of Marshalltown, Iowa.

The safety shutoff unit 62 includes a push-button hand valve 62a which is a three-way valve similar to the cutouts 61f and 61g, except for being hand operated. Closure of the hand valve 62a terminates the air supply by blocking the supply line 27. The NC port of the valve 62a serves to bleed the shut-off unit 62 after the valve 62a has operated.

After passing through the hand valve 62a, the air supply encounters the normally closed port NC of a safety shut-off valve 62b. The safety shutoff valve 62b has three ports like the air and propane cutouts 61f and 61g, but instead of domes has an entrapment chamber EC. Although the air supply cannot pass directly through the safety valve 62b, it is able to take a by-pass route to a second push-button valve 62c. The second push-button valve is of the same construction as the hand valve 62a described earlier. When the push-button valve 62c is operated, it permits air supply pressure to flow outwardly from the supply unit 60 along the supply line 64, to the controlled components. If a third push-button valve 63a is depressed about the same time, the air supply pressure extends through a low cutout pneumatic relay 63b and a high cutout pneumatic relay 63c, returning to the entrapment chamber EC of the safety shutoff valve 62b. This causes the safety shutoff valve 62b to operate, so that the by-pass route is no longer needed, and release of the push-button of the valve 62c restores the latter to its normal condition and permits the air supply to flow directly to the supply line 64 to the controlled components.

The low and high cutout relays 63b and 63c form the cutout unit 63 of FIG. 2. One of the relays 63b is for low pressure cutout, the other relay 63c is for high pressure cutout. Both relays are of similar construction to the supply cutout relays 61f and 61g described earlier. When the differential pressure from the detector 50 of FIG. 2 exceeds a prescribed level, the high pressure cutout relay 63c operates and bleeds the chamber of the safety shutoff valve 62b causing the system to shut down. Similarly when the pressure falls below a prescribed level, the entrapment chamber of the safety shutoff valve 62b is again bled to terminate operation of the system.

With respect to FIGS. 1-4 taken collectively, in a tested model of the invention the pilot 41 of the primary regulator 40-1 was set to maintain a gauge pressure of 25 p.s.i. for the propane gas at the mixer 30. The pilot 41' of the secondary regulator 40-2 was then set to maintain the air pressure in the secondary conduit 23-2 equal to the propane pressure. The third pilot of the system, namely the pilot 31 of the mixing unit 30, was set to maintain a gauge pressure of 22 p.s.i. for the mixed gases at the outlet from 33c of the mixer 30. The air supply cutout 61f and its lockup regulator 61d, along with the propane supply cutout 61g and its regulator 61c, were set for a gauge pressure of 35 p.s.i. Using an internal pressure regulator, the gauge pressure at the output of the supply unit 26 was set for 20 p.s.i. The low cutout pneumatic relay 63b of the cutout unit 63 was set for a gauge pressure of 3 p.s.i. while the high cutout pneumatic relay 63c was set for a gauge pressure of 15 p.s.i.

To start the system 10, the shutoff valves 25-1 and 25-2 in the primary and secondary conduits 23-1 and 23-2 were manually opened for both air and propane. However, the regulators 40-1 and 40-2 could not operate until their pilots 41 and 41' received a supply of air from the supply unit 60. To activate the supply unit, the hand valve 61e of the supply cutout unit 61 was closed. This operated the lockup regulators 61c and 61d when the pressures in the primary and secondary conduits 23-1 and 23-2 reached 35 p.s.i. At that point the air supply cutout 61f and the propane supply cutout 61g operated to extend the air supply to the safety shutoff unit 62.

With the air supply extended to the safety shutoff unit 62, the push buttons of two control valves 62c and 63a were depressed. This permitted the air supply to flow from the normally closed port of the valve 62c through its common port to all of the controlled components and also to be circulated through the high and low cutout pneumatic relays 63b and 63c to the entrapment chamber of the safety shutoff valve 62b. The air supply that is circulated to the safety shutoff valve 62b opens its normally closed port and closes its normally open port. Consequently, when the push-button valves 62c and 63a were released, returning to their normal "off" positions, the air supply was able to flow through the safety shutoff valve 62b through the first hand valve 62c along the supply line 64.

The presence of supply pressure at the primary regulator 40-1 activated the pilot 41, opening the valve of the control valve 42 and permitting propane vapor to be applied to the inlet port of the mixing unit 30. The differential pressure detector 50 immediately sensed a difference in pressure in the primary and secondary conduits 23-1 and 23-2 and supplied a control signal to the pilot 41' of the secondary regulator 40-2. In the tested model of the invention under consideration, the detector 30 was set so that an increase in propane pressure of 0.0025" W.C. above that in the air conduit caused an amplified signal of 1.6" W.C. to the pilot 41' of the secondary regulator.

With air supply available at the pilot 41', it acted upon the control valve 42 to permit air to be applied from the secondary conduit 23-2 to the second inlet of the mixing unit 30. Simultaneously, the pilot 31 of the mixing unit 30 opened the mixing valve 32 to maintain the output pressure of the mixing unit 30 at its set point. The differential pressure detector 50 continued to sense the pressure on each side of the mixing valve and adjust the pilot of the secondary regulator 40-2 in order to maintain the air pressure equal to the propane pressure within ¼" W.C. differential pressure.

The instrument supply unit 60 also continued to monitor the operation of the system to shut it down in the event of a malfunction. For example, if the air pressure in the secondary conduit falls below 35 p.s.i.g., the air supply cutout 61f and its lockup regulator 61d are immediately returned to their normal positions. This terminates the air supply of the supply unit 60 and allows all of the valves to return to their normal positions to shut off the system. Likewise if the propane pressure in the primary conduit 23-1 decreases below its set level of 35 p.s.i.g., a similar chain of events takes place. If the propane pressure at one inlet of the mixing valve 30 increases to as much as 10 inches of water above the air pressure at the other inlet of the mixing valve, the control pressure from the differential pressure detector 50 increases to 15 p.s.i.g., causing the pneumatic relay 63c to terminate the operation of the system. If the propane pressure at the mixing valve 30 reduces to a level where it is 10 inches of water below the air pressure, the control pressure from the detector 50 decreases to 3 p.s.i.g., causing the pneumatic relay 63b to function and shut down the system.

To terminate operation of the entire system, the hand valve 62a was manually depressed to close its normally open port and open its normally closed port. This stopped the flow of supply air and bleeds the residual supply air in the system, closing all of the control valves.

In one tested embodiment of the invention, the resulting gaseous mixture at the mixing unit was regulated to within ¼ of one percent by volume, even when the mixed gas withdrawn from the mixing chamber varied as much as from ten to one hundred percent.

Other modifications and adaptations of the invention will occur to those skilled in the art.

I claim:

1. A regulating system comprising:
   means for maintaining the pressure of a primary fluid at a prescribed level,
   means for regulating the pressure of a secondary fluid,
   means for monitoring the difference in pressure of said primary fluid maintained at said prescribed level and the regulated secondary fluid, and
   means, responsive to the monitoring means, for controlling the regulating means.

2. A regulating system comprising:
   means for providing a first fluid,
   means for providing a second fluid,
   means for mixing the fluids thus provided, and
   means responsive to a parameter of said first fluid, before mixing, for regulating a parameter of said second fluid before mixing.

3. Apparatus as defined in claim 2 further including:
   means for monitoring the density of the mixed fluids, and
   means coupling the density monitoring means to the regulating means for maintaining the density of the mixed fluids at a preassigned value.

4. Apparatus for regulating the mixing of fluids obtained from separate first and second sources, which comprises:
   independent means for regulating the pressure of fluid obtained from said first source,
   dependent means, responsive to the difference in pressure of the regulated fluid originating at said first source and the fluid originating at said second source, for regulating the fluid obtained from said second source, and
   means for mixing the fluids thus regulated.

5. A regulating system comprising:
   means for establishing a reference pressure level for a primary fluid in a primary conduit,
   means for controlling the pressure of a secondary fluid in a secondary conduit with respect to the reference pressure level established in said first conduit, and
   means connected jointly to said primary conduit and said secondary conduit for mixing said primary fluid with said secondary fluid,
   whereby the primary and secondary fluids form a mixture of prescribed proportions.

6. Apparatus as defined in claim 5 wherein the controlling means includes:
   means for detecting the differences in pressure of the fluids in the primary and secondary conduits before their entry into the mixing means, and
   a secondary regulator, controlled by the difference detecting means, connected to said secondary conduit.

7. Apparatus as defined in claim 6 wherein said secondary regulator is controlled by a signal which is an amplified counterpart of the pressure difference sensed by said difference detecting means.

8. Apparatus as defined in claim 6 further including:
   means for monitoring the density of the mixed fluids at the output of said mixing means, and
   means responsive to the density monitoring means for adjusting the control point of said secondary regulator,
   whereby the density of said mixture is maintained despite temperature and pressure variations in said secondary fluid.

9. Apparatus as defined in claim 6 further including means for providing a regulated supply of fluid to operate said mixing means, the establishing means, and said controlling means.

10. Apparatus as defined in claim 9 wherein, the providing means includes means for preventing the flow of the supply fluid to the units operated thereby until the primary and secondary fluids have attained prescribed pressure levels.

11. Apparatus as defined in claim 10 further including means for terminating the flow of said supply fluid to said units when the pressure difference sensed by said difference detecting means is at a prescribed threshold level, thereby to hold the proportions of said mixture within a prescribed range.

12. Apparatus as defined in claim 5 wherein the establishing means comprises a primary regulator including:
    a control valve for said primary conduit,
    a pilot for operating said control valve at a set level, and
    a sense line interconnecting the output of said control valve with said pilot,
    whereby said pilot, when activated, opens said control valve until the output pressure thereof as monitored by said sense line attains said set level.

13. Apparatus as defined in claim 6 wherein said regulator includes:
    a control valve for said secondary conduit,
    a pilot for operating said control valve, and
    a control line connecting said pilot to said difference detecting means.
    whereby said pilot, when activated, controls said control valve according to the signal in said control line.

14. Apparatus as defined in claim 5 wherein the mixing means includes:
    a control valve having inlet ports for the first and seconds conduits,
    a mixing chamber, and
    means for controlling the access of said inlet ports to said mixing chamber.

15. Apparatus as defined in claim 14 wherein said control valve includes:
    concentrically disposed slotted cylinders which are slidable and rotatable with respect to each other, and the access controlling means comprises means for relatively moving said cylinders in a longitudinal direction,
    thereby to regulate the volume of the mixture by controlling the access of said inlet ports to said mixing chamber to the same extent for both fluids.

16. Apparatus as defined in claim 15, said access controlling means further including means for relatively moving said cylinders in an angular direction, thereby to regulate said inlet ports differentially to control the ratio of the fluids forming said mixture.

17. Apparatus as defined in claim 12 wherein said primary regulator comprises:
    a control valve including a valve unit for regulating the passageway of said primary conduit and a spring-loaded diaphragm member contained in a casing for maintaining said valve unit in a normally closed condition,
    said pilot comprising a pressure controller including a fluid relay which is settable to operate at a prescribed pressure level, means for transmitting fluid to the casing of said control valve from the relay of said pressure controller to control said valve,
    means connected to said pressure controller for monitoring the output pressure of said control valve to operate the fluid relay of said pilot when said output pressure is below said prescribed pressure level, and
    supply means for activating the relay of said pressure controller
    whereby said valve unit is operated by said relay to maintain said output pressure at said prescribed level.

18. Apparatus as defined in claim 6 wherein the detecting means comprises:
a housing containing a pressure sensitive diaphragm,
means for applying pressure to one side of said diaphragm from said primary conduit and to the other side of said diaphragm from said secondary conduit,
supply means for activating said detecting means, and
means controlled by said diaphragm for applying pressure to said secondary regulator in proportion to the difference in pressure sensed thereby.

19. Apparatus as defined in claim 10 wherein the preventing means comprises:
first and second cutout relays having normally closed, normally open, common and control ports, the common port of the first cutout relay being connected to the normally closed port of the second cutout relay,
first and second regulators respectively connected to the control ports of said first and second cutout relays,
means for applying supply fluid to the normally closed port of said first relay,
means for applying said primary fluid to the control port of said first cutout relay, and
means for applying said secondary fluid to the control port of said second cutout relay,
whereby the attainment of prescribed pressure levels by said primary and secondary fluids operates said first and second cutout relays and extends said supply fluid to the common port of said second cutout relay.

20. Apparatus as defined in claim 10 further including safety shutoff means interconnecting said units with the preventing means, said safety shutoff means comprising:
a safety valve having normally closed, normally open and common ports and an entrapment chamber,
means for applying said supply fluid to the normally closed port of said safety valve,
a control valve having normally open, normally closed and common ports and a control button, the normally open port and the normally closed ports of said control valve being respectively connected to the common port and the normally closed port of said safety valve,
means for diverting a portion of the output at the common port of said control valve to the entrapment chamber of said safety valve,
whereby push button operation of said control valve extends said supply fluid to the common port thereof, a portion of said supply fluid being diverted to said entrapment chamber to activate said safety valve and maintain said supply fluid at said control valve after the release of said control button.

21. Apparatus as defined in claim 20 wherein the diverting means comprises means for bleeding the entrapment chamber of said safety valve in response to a signal from the detecting means outside of a prescribed pressure range to thereby shut off the supply of fluid to said units.

References Cited

UNITED STATES PATENTS

| | | | |
|---|---|---|---|
| 1,452,265 | 4/1923 | Collins et al. | 137—7 |
| 2,707,964 | 5/1955 | Monroe | 137—88 X |
| 3,250,218 | 5/1966 | Sinclair | 137—88 X |

NATHAN L. MINTZ, *Primary Examiner.*